United States Patent
Singh

(10) Patent No.: US 11,882,193 B2
(45) Date of Patent: *Jan. 23, 2024

(54) REAL-TIME, INTELLIGENT PAIRING AND PRIORITIZING OF CLIENT AND SERVER DATA QUEUES USING ULTRA-WIDE BAND

(71) Applicant: BANK OF AMERICA CORPORATION, Charlotte, NC (US)

(72) Inventor: Shailendra Singh, Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/192,400

(22) Filed: Mar. 29, 2023

(65) Prior Publication Data

US 2023/0388387 A1 Nov. 30, 2023

Related U.S. Application Data

(63) Continuation of application No. 17/828,576, filed on May 31, 2022, now Pat. No. 11,695,839.

(51) Int. Cl.
*H04L 67/306* (2022.01)
(52) U.S. Cl.
CPC .................. *H04L 67/306* (2013.01)
(58) Field of Classification Search
None
See application file for complete search history.

(56) References Cited

U.S. PATENT DOCUMENTS

| | | | |
|---|---|---|---|
| 7,737,857 B2 | 6/2010 | Ebert et al. |
| 7,805,377 B2 | 9/2010 | Felsher |
| 8,194,646 B2 | 6/2012 | Elliott et al. |
| 8,295,471 B2 | 10/2012 | Spottiswoode et al. |
| 8,422,994 B2 | 4/2013 | Rhoads et al. |
| 8,635,164 B2 | 1/2014 | Rosenhaft et al. |
| 8,670,548 B2 | 3/2014 | Xie et al. |
| 8,694,455 B2 | 4/2014 | Eder |
| 8,756,684 B2 | 6/2014 | Frantz et al. |
| 8,903,079 B2 | 12/2014 | Xie et al. |
| 8,909,771 B2 | 12/2014 | Heath |
| 8,924,269 B1 | 12/2014 | Schliehe-Diecks et al. |
| 8,930,253 B1 | 1/2015 | Ball |
| 8,965,957 B2 | 2/2015 | Barros |
| 9,047,578 B2 | 6/2015 | Dvorak et al. |
| 9,152,681 B2 | 10/2015 | Erhart et al. |

(Continued)

OTHER PUBLICATIONS

Kua et al., "A Survey of Rate Adaptation Techniques for Dynamic Adaptive Streaming Over HTTP", Sep. 15, 2017, IEEE, IEEE Communications Surveys & Tutorials (vol. 19, Issue: 3, pp. 1842-1866) (Year: 2017).*

*Primary Examiner* — Davoud A Zand

(57) ABSTRACT

A system is presented for matching user devices with resource devices. User preference and profile information are communicated from user devices to a queue management server. The user preference information is parsed. Availability of the resource devices is forecasted based at least in part upon the resource information and resource devices are selected to service user devices based at least in part upon the forecast. User devices are added to the end of data queues for the resource devices. The data queues are communicated to the user devices and the resource devices.

20 Claims, 3 Drawing Sheets

(56) References Cited

U.S. PATENT DOCUMENTS

| | | |
|---|---|---|
| 9,336,526 B2 | 5/2016 | Tuchman et al. |
| 9,411,864 B2 | 8/2016 | Glider et al. |
| 9,419,951 B1 | 8/2016 | Felsher et al. |
| 9,495,331 B2 | 11/2016 | Govrin et al. |
| 9,674,358 B1 | 6/2017 | Daddi et al. |
| 9,763,093 B2 | 9/2017 | Richards et al. |
| 9,824,390 B2 | 11/2017 | Adapalli et al. |
| 9,832,205 B2 | 11/2017 | Santhi et al. |
| 9,832,646 B2 | 11/2017 | Richards et al. |
| 9,880,807 B1 | 1/2018 | Haggerty et al. |
| 9,883,038 B2 | 1/2018 | Aleksin et al. |
| 9,884,374 B2 | 2/2018 | Novak et al. |
| 9,978,089 B2 | 5/2018 | Patel et al. |
| 10,043,164 B2 | 8/2018 | Dogin et al. |
| 10,096,033 B2 | 10/2018 | Heath |
| 10,102,546 B2 | 10/2018 | Heath |
| 10,122,858 B2 | 11/2018 | Baranovsky et al. |
| 10,127,564 B2 | 11/2018 | Heath |
| 10,264,129 B2 | 4/2019 | Bischoff et al. |
| 10,346,937 B2 | 7/2019 | Ford |
| 10,360,541 B2 | 7/2019 | Gromley et al. |
| 10,375,240 B1 | 8/2019 | Daddi et al. |
| RE47,896 E | 3/2020 | Frenkel et al. |
| 10,691,715 B2 | 6/2020 | Wesley, Sr. et al. |
| 10,923,109 B2 | 2/2021 | Chakraborty et al. |
| 11,196,863 B2 | 12/2021 | Spohrer |
| 11,258,907 B2 | 2/2022 | Kan et al. |
| 11,315,194 B2 | 4/2022 | Blessman et al. |
| 2016/0065641 A1* | 3/2016 | Chesluk ............... H04L 65/612 709/219 |
| 2016/0112497 A1* | 4/2016 | Koushik ............... G06Q 20/123 715/739 |
| 2016/0196587 A1 | 7/2016 | Eder |
| 2018/0211718 A1 | 7/2018 | Heath |
| 2018/0216946 A1 | 8/2018 | Gueye |
| 2018/0357251 A1 | 12/2018 | Kumarasamy et al. |
| 2019/0253558 A1 | 8/2019 | Haukioja et al. |
| 2019/0387058 A1* | 12/2019 | Heller ................... H04L 43/08 |
| 2020/0050494 A1 | 2/2020 | Bartfai-Walcott et al. |
| 2021/0117425 A1* | 4/2021 | Rao ....................... H04L 9/0866 |
| 2021/0234963 A1 | 7/2021 | Spottiswoode et al. |
| 2022/0004926 A1 | 1/2022 | Cella |

* cited by examiner

REAL-TIME, INTELLIGENT PAIRING AND PRIORITIZING OF CLIENT AND SERVER DATA QUEUES USING ULTRA-WIDE BAND

CROSS-REFERENCE TO RELATED APPLICATION

The application is a continuation of U.S. patent application Ser. No. 17/828,576, filed May 31, 2022, by Shailendra Singh, and entitled "REAL-TIME, INTELLIGENT PAIRING AND PRIORITIZING OF CLIENT AND SERVER DATA QUEUES USING ULTRA-WIDE BAND," which is incorporated herein by reference.

TECHNICAL FIELD

The present disclosure relates generally to network system resource management using 15 wide-band communications, and more specifically to real-time, intelligent pairing and prioritizing of client and server data queues using ultra-wide band.

BACKGROUND

Current state of the art information technology lacks the features necessary to manage and utilize resources in a manner that optimizes computing and networking system technologies.

SUMMARY

The present disclosure describes a system and a method that optimizes computing and networking system technologies by using knowledge of resources and users to streamline coordinating system resources. The system is particularly integrated in network systems as a queue management server, wireless router, user devices, and resource devices.

In one practical application, the system matches resources with users based on resource availability, resource information, and user profile and preference information. Users are then added to one or more data queues and the data queues are sent to a user device and an agent or kiosk resource. In another practical application, the system determines location information of user devices, tracks movements of the user devices, and communicates user preference information and user profile information to resource devices when user devices are within range of resource devices. In both cases, customized information for the user device is displayed on an agent or kiosk resource device.

One or more technical advantages are realized through efficient use of network resources when the network system is used to detect the presence of users and harvest information about services, users, resources, location, and positioning to streamline the provisioning of resources.

In a practical application, one or more wireless devices are positioned inside a facility. A queue management server is communicatively coupled to the one or more wireless devices and one or more resource devices are communicatively coupled to the queue management server. The wireless devices are configured to detect the presence of user devices within a space defined by the wireless range of the wireless devices and route communications from the user devices to the queue management server. The user devices are configured to communicate user preference information and user profile information to the queue management server. The described systems and their operations improve the efficient use of technology by pairing user devices with resources according to a number of different parameters; and by customizing the information presented by those resources when the user device is within a threshold distance of the resources devices. This reduces the likelihood that resources are provisioned incorrectly which often leads to wasted resources, such as computer and networking technologies, and the need to provision new resources after detecting an error. By reducing the waste of resources in this manner, the disclosed systems improve the underlying operation and usage of computing and networking technologies.

The queue management server harvests information about services, users, resources, and resource devices and uses the information to match users to particular services, resources, and resource devices. The queue management server adds the information to data queues and sends the data queues to the users and the resources.

In addition, the wireless devices determine the location of the user devices, and the queue management server uses the location information to track the user devices within the facility. The queue management server sends the queues to the resources when the users are within threshold ranges of the resources.

Described in greater detail is a system for efficiently matching users with resources. The system comprises a first user device comprising a first user device memory and a first user device processor. The first user device memory stores first user preference information associated with the first user and first user profile information. The first user device processor is configured to communicate the first user preference information to a queue management server. The queue management server comprises a queue management memory and a queue management processor. The queue management memory stores resources information that represents capabilities of a plurality of resources, and that indicates availability of each of the plurality of resources. The queue management processor is configured to parse the first user preference information, compare the resources information associated with the plurality of resources with the parsed first user preference information, forecast an availability of the resources for the first user based at least in part upon the resources information, select a first resource to service the first user based at least in part upon the comparison and the forecast, add the first user to an end of a first data queue for the selected first resource, and communicate the first queue to the first user device associated with the user.

In another practical application, a user device processor communicate wireless signals to the one or more wireless devices in conjunction with communicating user preference information and user profile information to the queue management server. The one or more wireless devices each comprise a wireless device memory and a wireless device processor. The wireless device memory stores the wireless signals received from the user devices. The wireless device processors determine location information for the user device within a defined space at different points in time based at least in part upon the wireless signals received from the user device. The wireless device processor communicates location information for the user device to the queue management server. The queue management server receives location information for the user device, tracks movement of the user device within the defined space based at least in part upon the location information for the user device. The queue management server determines when a particular user device is within a threshold distance of a particular resource device, based at least in part upon the determined location information for the particular user device and location information for the particular resource device positioned in the defined space. For example, the user device may be matched with the particular resource device in a data queue. The queue management server communicates a notification signal to the particular resource device indicating that the particular user device is within a threshold distance of the particular resource device. The queue management server communicates the user preference information and the user profile information to the particular resource device in conjunction with the notification signal. Additionally, the particular resource device is configured to display customized information for the user device based at least in part upon the user preference information and the user profile information.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
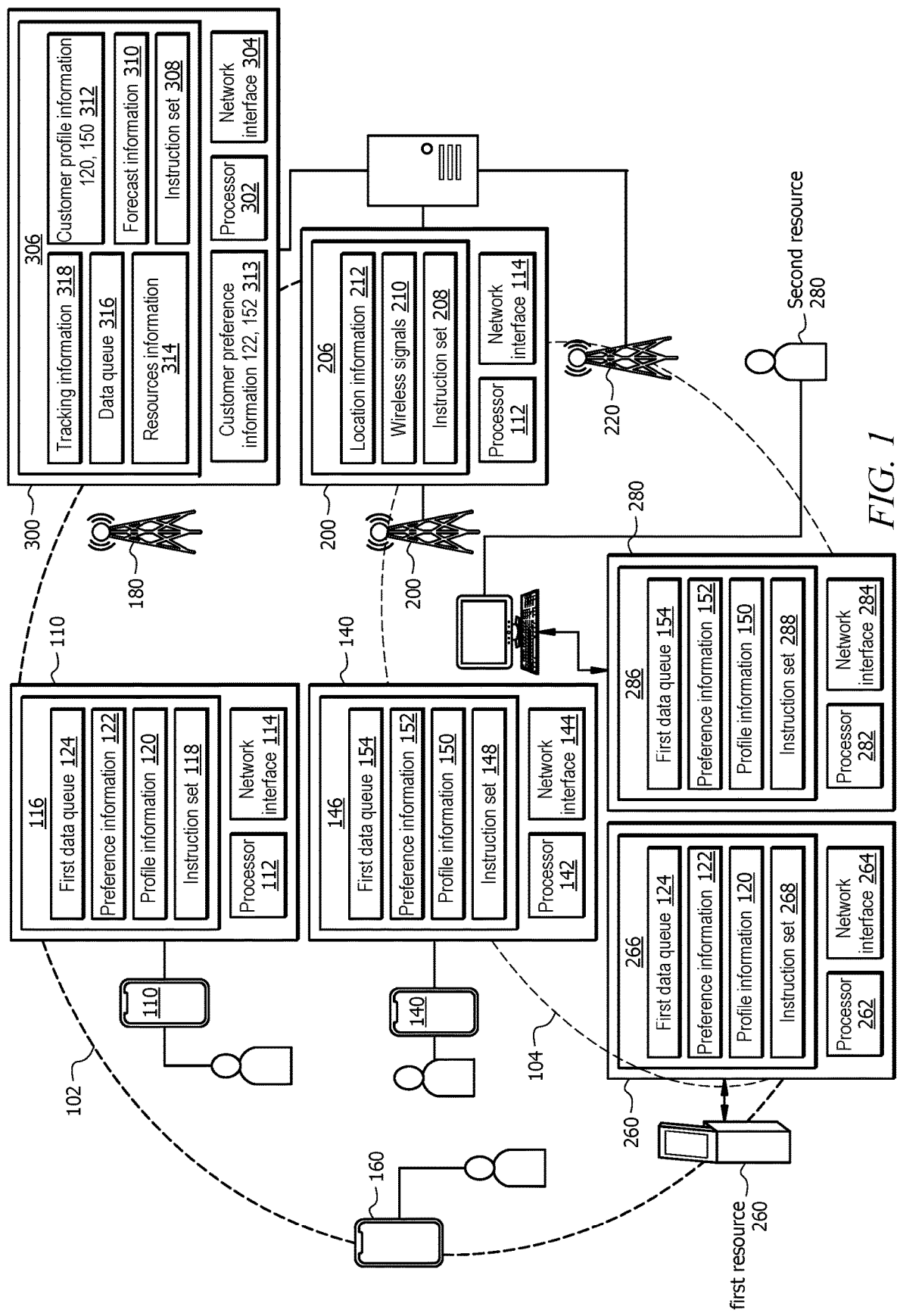
FIG. 1 illustrates an embodiment of a system for matching user devices to resource devices and tracking user devices.
Figure 2:
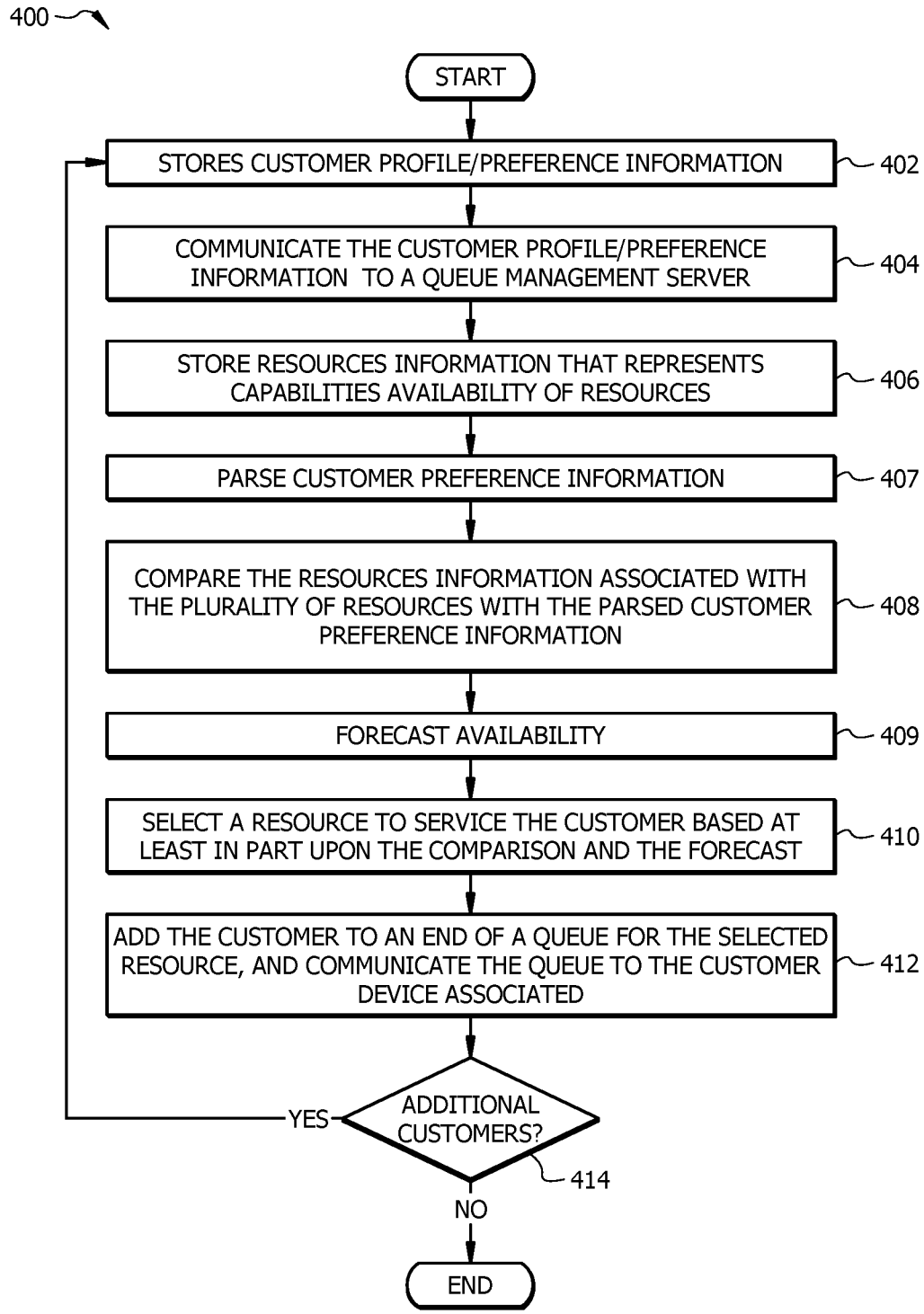
FIG. 2 illustrates an example operational flow for matching user devices to resource devices.
Figure 3:
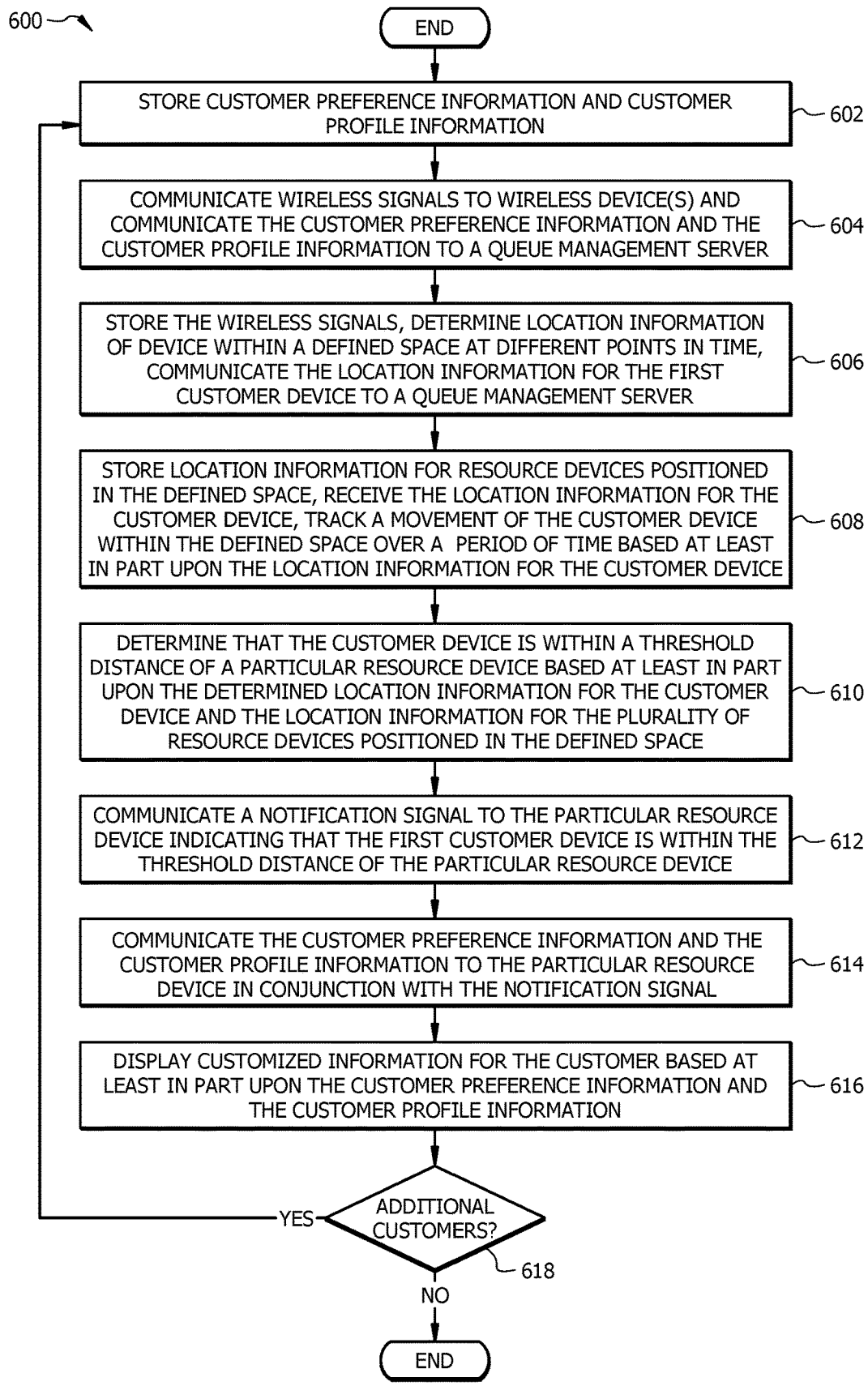
FIG. 3 illustrates an example operational flow of tracking user devices.

As described above, previous technologies fail to optimize computing and networking system resources. This disclosure addresses those limitations. FIG. 1 illustrates an example embodiment of an example system 100 that matches user devices to resource devices, and tracks user devices. System 100 comprises user devices 110, 140, and 160, wireless devices 180, 200, 220, resource devices (kiosk) 260 and (agent desktop) 280, and queue management server 300. FIG. 2 illustrates an example embodiment of an operational flow 400 for matching user devices to resource devices. FIG. 3 illustrates an example embodiment of an operational flow 600 for tracking the user devices within a facility or space 102.

In general, system 100 is configured to detect user devices 110, 140, and 160 within space 102, create data queues 124, 154 based on resources (agents and devices) information 314 and user information 312, 313, locate and track user devices 110, 140, and 160 while the devices 110, 140, and 160 are in space 102, and send the data queues 124, 154 to user devices 110, 140, and 160 and resource devices 260 and 280 when user devices 110, 140, and 160 are within a threshold distance 104 of resource devices 260 and 280.

Example System

Referring to FIG. 1, first user device 110 comprises a processor 112, network interface 114, memory 116, instruction set 118, profile information 120, preference information 122, and first data queue 124. Second user device 140 comprises a processor 142, network interface 144, memory 146, instruction set 148, profile information 150, preference information 152, and second data queue 154. Third user device 160 (and any suitable number and combination of additional user devices that may be present within space 102) also includes the same or similar components as first user device 102 and second user device 140, but for the sake of brevity, the description of such is not included.

First resource device (kiosk) 260 comprises a processor 262, network interface 264, and memory 266. Memory 266 comprises instruction set 268, profile information 120, preference information 122, and first data queue 124. Second resource device (agent desktop) 280 comprises a processor 282, network interface 284, memory 286, instruction set 288, profile information 150, preference information 152, and second data queue 154. Wireless device 200 comprises a processor 202, network interface 204, and memory 206. Memory 206 comprises an instruction set 208, wireless signals 210, and location information 212. Queue management server 300 comprises processor 302, network interface 304, and memory 306. Memory 306 comprises forecast information 310, profile information 120 and 150 referenced as profile information 312, preference information 122 and 152 referenced as preference information 312, resources information 314, first data queue 124 and second data queue 154 referenced as data queues 316, and tracking information 318.

In practice, the number and combination of user devices, resource devices, and queue management severs may vary. Depending at least on the size of space 102, the number and combination of these components may be significantly greater than or less than what is illustrated in FIG. 1 and described herein.

In a practical application, system 100 can be particularly integrated into a network facility of a banking entity and configured to optimize networking and computing resources in the network facility. The network facility can comprise networking equipment and personal computing equipment configured to process, store, and communicate data related to a particular entity, such as professional banking services and related network application services.

In the practical application, a space 102 of the banking entity includes first, second, and third users associated with user devices 110, 140, and 160, respectively, and first resource device (kiosk) 260 and an agent of the bank associated with second resource device (agent desktop) 280. Additional resources devices 260 and 280 are contemplated depending on the needs of the network facility.

In an example use case, the first user associated with user device 110 enters the office space first followed by the second user associated with user device 140, and the third user associated with third user device 160 enters thereafter. Each user's profile information 120, 150 can describe basic biographical information about the user. Each of the devices 110, 140, and 160 can collect relevant information about the user's preferences from device files while the user is using the device. The relevant information can be information that indicates the user may be interested in one or more products or related banking services. The information collected over a period of time may be collected from internet searches and related data, notes the user has entered in the user device, third party sources, among other sources.

In a particular embodiment, first resource device (kiosk) 260 may be configured to manage particular products or services (e.g., treasury bond transactions, open and close accounts, and other basic user services). Second resource device (agent desktop) 280 may be configured to manage the same or different products and services (e.g., several loan types, such as home loans and remodeling loans). This information about the kiosk and/or agent and their associated schedules are included in resources information 314.

The network facility also includes wireless devices 180 and 200 positioned at different locations in space 102 and a queue management server 300. Wireless devices 180 and 200 detect user devices 110, 140, and 160 within the space 102 and establish and maintain a data session with each user device 110, 140, and 160. User devices 110 send profile information 120 and preference information 122, user device 140 sends profile information 150 and preference information 152, and user device 160 sends the same to the wireless device 200 using wireless signals. Wireless device 200 routes profile information and preference information of all three devices to queue management server 300.

While the session is maintained, wireless devices 180 and/or 200 determine location information for each user device 110, 140, and 160, periodically or upon a change in a measured or detected parameter. Wireless devices 180 and/or 200 route the location information for each user device 110, 140, and 160 and user preference information 122, 152, and the same for the third device, user profile information 120, 150, and the same for the third device to queue management server 300.

Queue management server 300 maintains tracking information 318 based on the feed of location information from wireless devices 180 and/or 200. Queue management server 300 parses user profile information 120 and 150, user profile information 120 and 150, and the same for third user device 160 and stores the parsed user preference information 122 and 152, user profile information 120 and 150, and the same for the third user device 160 in memory 306.

Queue management server 300 evaluates preference information 122, 152, and the same for the third user device 160 and determines the needs for each user (e.g., the first user is interested in securing a loan to purchase a home, the second user is interested in opening a savings account, and the third user is interested in securing a loan for a remodeling project and buying treasury bonds). Queue management server 300 can store the results of the evaluation for each in the user profile and preference information 312 and 313.

Queue management server 300 compares the potential services for each user and the current date and time with the availability of each resource and the capability of each resource in the resources information 314. In this particular use case, queue management server 300 selects a location and a suitable time of day based on resources available, resources capabilities, and/or resource schedules in resources information 314. Queue management server 300 stores the location and time in forecast information 310.

In this particular use case, queue management server 300 matches the first user device 110 with the second resource device 280, matches the second user device 140 with the first resource device 260, and matches the third user device 160 with the first resource device 260, but behind the second customer device 140 in the data queue 316, based on the user profile/preference information 312 and 313 and resources information 314. Additionally, queue management server 300 can assign a prioritization level to one or more of the matches. The assigned prioritization levels can be based on arrival time, estimated service time, service type, and profile information.

For example, the second user device 140 can be prioritized in the second data queue 154 for second resource device 280 ahead of third user device 160 if the second user device 140 arrived at the network facility before the third user device 160. Queue management server 300 stores the matches in data queues 316.

Queue management server 300 can send a notification to each user device 110, 140, and 160 notifying the user of the matched resources, locations, and schedules. Queue management server 300 can also monitor the data queues 316 and tracking information 318 for each user device 110, 140, and 160. When the user devices 110, 140, and 160 are within a threshold distance 104 of corresponding resources devices 260 and 280 with which they have been matched, at the scheduled time, queue management server 300 sends appropriate user profile/preference information 312 and 313 to appropriate resources devices 260 and/or 280 for customized presentation on the display of the corresponding resource device 260.

For example, when first user device 110 is tracked to be within a threshold distance of second resource device 280 at or near the time of the scheduled meeting as set forth in the appropriate data queue 316, then customized information based at least in part upon profile and preference information for first user device 110 is presented on the display of the second resource device 280. Similarly, when second user device 140 is tracked to be within a threshold distance of first resource device 260 at or near the time of the scheduled meeting as set forth in the appropriate data queue 316, then customized information based at least in part upon profile and preference information for second user device 140 is presented on the display of the first resource device 260. Continuing with this example, when third user device 160 is tracked to be within a threshold distance of first resource device 260 at or near the time of the scheduled meeting as set forth in the appropriate data queue 316, then customized information based at least in part upon profile and preference information for third user device 160 is presented on the display of the first resource device 260.

System 100 optimizes network and computing resources by facilitating matching user devices with resource devices, generating data queues of relevant information for a particular service, and tracking user devices to facilitate a customized presentation of information on the appropriate resource device at the appropriate time.

System Components

User Devices

User devices 110, 140, and 160 are devices configured to process data and communicate with computing devices, databases, systems, etc., via one or more networks. User devices 110, 140, and 160 are generally configured to store user preference 124 and 154 and profile information 120 and 150 and communicate this information to other components in system 100.

Processors 112 and 142 are in signal communication with network interfaces 114 and 144 and memories 116 and 146. Memories 116 and 146 are configured to store software instruction sets 118 and 148 that when executed by processors 112 and 142 cause processors 112 and 142 to perform one or more functions described herein.

Processors 112 and 142 comprise any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). Processors 112 and 142 may be a programmable logic device, a microcontroller, a microprocessor, or any suitable combination of the preceding. Processors 112 and 142 are configured to process data and may be implemented in hardware or software. For example, processors 112 and 142 may be 8-bit, 16-bit, 32-bit, 64-bit, or of any other suitable architecture. Processors 112 and 142 may include an arithmetic logic unit (ALU)

for performing arithmetic and logic operations, processor registers that supply operands to the ALU and store the results of ALU operations, and a control unit that fetches instructions from memory and executes them by directing the coordinated operations of the ALU, registers and other components. Processors 112 and 142 are configured to implement various instructions. For example, processors 112 and 142 are configured to execute software instruction sets 118 and 148 to implement the functions disclosed herein, such as some or all of those described with respect to FIGS. 1-3. In some embodiments, the function described herein is implemented using logic units, FPGAs, ASICs, DSPs, or any other suitable hardware or electronic circuitry.

Network interfaces 114 and 144 are configured to enable wired and/or wireless communications. Network interfaces 114 and 144 are configured to communicate data between memories 116 and 146 and other network devices, systems, or domain(s). For example, network interfaces 114 and 144 may comprise a WIMAX interface, WIFI interface, a local area network (LAN) interface, a wide area network (WAN) interface, a modem, a switch, or a router. Processors 112 and 142 are configured to send and receive data using the network interfaces 114 and 144 and memories 116 and 146. Network interface 114 and 144 may be configured to use any suitable type of communication protocol.

Memories 116 and 146 may be volatile or non-volatile and may comprise a read-only memory (ROM), random-access memory (RAM), ternary content-addressable memory (TCAM), dynamic random-access memory (DRAM), and static random-access memory (SRAM). Memories 116 and 146 may be implemented using one or more disks, tape drives, solid-state drives, and/or the like. Memories 116 and 146 are operable to store software instruction sets 118 and 148, user preference information 122 and 152, and profile information 120 and 150. The software instruction sets 118 and 148 may comprise any suitable set of instructions, logic, rules, or code that are executed by processors 112 and 142.

Wireless Devices

The wireless devices 180, 200, and 220 are configured to process data, communicate with computing devices, databases, systems, etc., via one or more networks. The wireless devices 180, 200, and 220 are configured to send and receive wireless signals over a wireless range, to route data, and determine location information for user devices 110, 140, and 160. The wireless devices 180, 200, and 220 may be configured as shown, or in any other suitable configuration.

Processor 202 is in signal communication with network interface 204 and memory 206. Memory 206 is configured to store software instruction set 208 that when executed by processor 202 causes the processor to perform one or more functions described herein. For example, when software instruction set 208 is executed, processor 202 can determine location information for any of the devices 110, 140, and 160 in system 100 and stores wireless signals 210 and location information 212 determined for the devices 110, 140, and 160. Processor 202 may be configured as shown, or in any other configuration. Location information 212 may include x,y,z coordinates of a particular user device 110, 140, and/or 160 within the facility; GPS coordinates of a particular user device 110, 140, and/or 160, or any other suitable form of information that can represent the location of a user device 110, 140, and/or 160 within a facility.

Processor 202 comprises any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 202 may be a programmable logic device, a microcontroller, a microprocessor, or any suitable combination of the preceding. For example, processor 202 may be 8-bit, 16-bit, 32-bit, 64-bit, or of any other suitable architecture. Processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 202 is configured to implement various instructions. For example, processor 202 is configured to execute software instruction set 208 to implement the functions disclosed herein, such as some or all of those described with respect to FIGS. 1-3. In some embodiments, the function described herein is implemented using logic units, FPGAs, ASICs, DSPs, or any other suitable hardware or electronic circuitry.

Network interface 204 is configured to enable wired and/or wireless communications. Network interface 204 is configured to communicate data between memory 206 and other network devices, systems, or domain(s). For example, network interface 204 may comprise a WIMAX interface, WIFI interface, a local area network (LAN) interface, a wide area network (WAN) interface, a modem, a switch, or a router. Processor 202 is configured to send and receive data using network interface 204 and memory 206. Network interface 204 may be configured to use any suitable type of communication protocol.

Memory 206 may be volatile or non-volatile and may comprise a read-only memory (ROM), random-access memory (RAM), ternary content-addressable memory (TCAM), dynamic random-access memory (DRAM), and static random-access memory (SRAM). Memory 206 may be implemented using one or more disks, tape drives, solid-state drives, and/or the like. Memory 206 is operable to store software instruction set 208, wireless signals 210, and location information 212. Instruction set 208 may comprise any suitable set of instructions, logic, rules, or code that are executed by processor 202.

Resource Devices

The resource devices (kiosk) 260 and (agent desktop) 280 are devices that are configured to process data and communicate with computing devices, databases, systems, etc., via one or more networks. The resource devices (kiosk) 260 and (agent desktop) 280 are configured to route data, and send and receive wireless communications. The resource devices (kiosk) 260 and (agent desktop) 280 may be configured as shown, or in any other suitable configuration.

Processors 262 and 282 are in signal communication with network interfaces 264 and 284 and memories 266 and 286. Memories 266 and 286 are configured to store software instruction sets 268 and 288 that when executed by processors 262 and 282 cause the processors 262 and 282 to perform one or more functions described herein. For example, when the software instruction sets 268 and 288 are executed, the processors 262 and 282 store profile information 120 and 150, preference information 122 and 152, and create first data queue 124 and second data queue 154. The processors 262 and 282 may be configured as shown, or in any other configuration.

Processors 262 and 282 comprise any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processors 262 and 282 may be a programmable logic device, a microcontroller, a microprocessor, or any suitable combination of the preceding. For example, processors 262 and 282 may be 8-bit, 16-bit, 32-bit, 64-bit, or of any other suitable architecture. Processors 262 and 282 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processors 262 and 282 are configured to implement various instructions to implement the functions disclosed herein, such as some or all of those described with respect to FIGS. 1-3. In some embodiments, the function described herein is implemented using logic units, FPGAs, ASICs, DSPs, or any other suitable hardware or electronic circuitry.

Network interfaces 264 and 284 are configured to enable wired and/or wireless communications. Network interfaces 264 and 284 are configured to communicate data between memories 266 and 286 and other network devices, systems, or domain(s). For example, network interfaces 264 and 284 may comprise a WIMAX interface, a WIFI interface, a local area network (LAN) interface, a wide area network (WAN) interface, a modem, a switch, or a router. Processors 262 and 282 are configured to send and receive data using network interfaces 264 and 284 and memories 266 and 286. Network interfaces 264 and 284 may be configured to use any suitable type of communication protocol.

Memories 266 and 286 may be volatile or non-volatile and may comprise a read-only memory (ROM), random-access memory (RAM), ternary content-addressable memory (TCAM), dynamic random-access memory (DRAM), and static random-access memory (SRAM). Memories 266 and 286 may be implemented using one or more disks, tape drives, solid-state drives, and/or the like. Memories 266 and 286 are operable to store software instruction sets 268 and 288, profile information 120, preference information 122, first data queue 124, and second data queue 126. Instruction sets 268 and 288 may comprise any suitable set of instructions, logic, rules, or code that are executed by processors 142 and 162.

Queue Management Server

Queue management server 300 is a device that is configured to process data and communicate with computing devices, databases, systems, etc., via one or more networks. Queue management server 300 is further configured to create and send the first data queue 124 to the first user device 110 and the second data queue 154 to the second user device 140. Queue management server 300 is further configured to create and send the first data queue 124 to the first resource device 260 and the second data queue 154 to the second resource device 280. Queue management server 300 may be configured as shown, or in any other suitable configuration.

Processor 302 is in signal communication with network interface 304 and memory 306. Memory 306 is configured to store software instruction set 308 that when executed by processor 302 causes the processor to perform one or more functions described herein.

Processor 302 comprises any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). Processor 302 may be a programmable logic device, a microcontroller, a microprocessor, or any suitable combination of the preceding. For example, Processor 302 may be 8-bit, 16-bit, 32-bit, 64-bit, or of any other suitable architecture. Processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 302 is configured to implement various instructions to implement the functions disclosed herein, such as some or all of those described with respect to FIGS. 1-3. In some embodiments, the function described herein is implemented using logic units, FPGAs, ASICs, DSPs, or any other suitable hardware or electronic circuitry.

Network interface 304 is configured to enable wired and/or wireless communications. Network interface 304 is configured to communicate data between memory 306 and other network devices, systems, or domain(s). For example, network interface 304 may comprise a WIFI interface, a local area network (LAN) interface, a wide area network (WAN) interface, a modem, a switch, or a router. Processor 302 is configured to send and receive data using network interface 304 and memory 306. Network interface 304 may be configured to use any suitable type of communication protocol.

Memory 306 may be volatile or non-volatile and may comprise a read-only memory (ROM), random-access memory (RAM), ternary content-addressable memory (TCAM), dynamic random-access memory (DRAM), and static random-access memory (SRAM). Memory 306 may be implemented using one or more disks, tape drives, solid-state drives, and/or the like. Memory 306 is operable to store software instruction set 308, forecast information 310, profile and preference information 312 and 313, resources information 314, data queues 316, and tracking information 318. Instruction set 308 may comprise any suitable set of instructions, logic, rules, or code that are executed by processor 302.

Data Queue

Data queues 124, 154, and 316 include information matching particular user devices 110, 140, and 160 with particular resources devices 260 and 280 to facilitate the rendering of services based on the comparison of various user profile and preference information 312 and 313 with various resources information 314. As an example, each data queue can identify a user device, resource device, service, scheduling information, navigation information for the user device to the resource device, prioritization, and other relevant information.

Operational Flow

Referring to FIG. 1, user devices 110, 140, and 160 are configured to establish a session with wireless devices 180, 200, and/or 220, and send and receive wireless signals bearing information to and from wireless devices 180, 200, and/or 220 during the established session. User devices 110, 140, and 160 are configured to obtain profile information 120 and 150 and preference information 122 and 152, and send this to queue management server 300.

In an embodiment, one or more user devices 110, 140, and 160 can be configured with an accessible device file that is part of a third-party application service and comprises user profile information 120 and 150 that can be bibliographical related and application service related. In another embodiment, user devices 110, 140, and 160 are configured to use a crawler and a set of rules relevant to a particular application to identify preference information 122 and 152.

User devices 110, 140, and 160 are configured to establish a session with queue management server 300, and send and receive profile information 120 and 150 and preference information 122 and 152.

Wireless devices 180, 200, and/or 220 are configured to send and receive wireless signals bearing information to and from user devices 110, 140, and 160. Wireless device 180 and wireless device 200 are configured to send and receive information to and from queue management server 300. Wireless devices 180, 200, and/or 220 can be configured to communicate with any device of system 100.

Wireless devices 180, 200, and/or 220 are configured to determine location information 212 for user devices 110, 140, and/or 160 based on at least one of received wireless signals. Wireless devices 180, 200, and/or 220 are configured to communicate this location information 212 to the queue management server 300 for the purpose of tracking user devices 110, 140, and 160 within system 100.

In some embodiments, the positional coordinates of all or some of the user devices 110, 140, and 160, resource devices 260 and 280, and wireless devices 180, 200, and 220 may be known from previously determined measurements. The known positional coordinates can be used by one of the wireless devices 180, 200, and/or 220 to determine location information of any device, such as one of the user devices 110, 140, and 160. Location information 212 may be determined using any suitable location determination mechanism, such using trilateration or triangulation. In another embodiment, wireless devices 180 and 200 are configured to receives GPS coordinates from user devices 110, 140, and 160 and send the GPS coordinates, identified as location information 212, to queue management server 300. In yet another embodiment, wireless devices 180, 200, and/or 220 are configured to receive the GPS coordinates automatically in response to session establishment. In still another embodiment, wireless devices 180, 200, and/or 220 are configured to send a request to one or more user devices 110, 140, and 160 and receive in response GPS coordinates.

System 100 optimizes network and computing resources by facilitating accurate pairing of user devices with resource devices, generating a data queue of relevant information for a particular service, and tracking user devices within a network facility. System 100 minimizes the amount of data introduced into the network facility infrastructure by using intelligence to efficiently pair users with resources and using user location information to release service-related data queues.

Example Methods

Referring to FIGS. 2 and 3, illustrated are example embodiments of a method 400 and a method 600 for practicing system 100. In a practical application, methods 400 and 600 can be particularly integrated into a network facility of an entity to optimize networking and computing resources.

Methods 400 and 600 optimize network and computing resources by facilitating pairing of user devices with resource devices, generating a data queue of relevant information for a particular service, and tracking user devices within a network facility.

Referring now to FIG. 2, illustrated is an example embodiment of a diagram of an example operational flow for system 100 to match users to resources denoted generally as 400. Operation 400 begins at block 402 where first user preference information 122 and first user profile information 120 are stored in memory 116. Operation 400 continues at block 404 where first user profile information 120 and preference information 122 are communicated to queue management server 300.

At block 406, server 300 stores resources information 314 that represents capabilities and availabilities of resources 260 and 280. At block 407, server 300 parses first user preference information 122. At block 408, server 300 compares resources information 314 associated with resource devices 260 and 280 with parsed first user preference information 122. At block 409, server 300 forecasts an availability of the resources for the first user based at least in part upon the resources information 314.

At block 410, server 300 selects first resource device 260 to service the first user based at least in part upon the comparison and the forecast. For example, if the first resource device 260 has the capability to address the preferences of the first user device 110 and also has the availability to service the first user device 110, then the first resource device 260 may be selected to match with the first user device 110. At block 412, server 300 adds the first user to an end of first queue 124 for selected first resource device 260 and communicates first queue 124 to first user device 110 and to resource device 260. First queue 124 for selected first resource device 260 represents a numerically ordered list of user devices assigned to selected first resource device 260. For example, the first resource device 260 may be selected to service a number of different user devices 110 and 140 in a particular order and based on a particular schedule, which is stored in the data queue 124. At block 414, server 300 determines if there are additional user devices to process. If so, operation 400 returns to block 402. If not, operation 400 ends.

Although operation 400 is described with respect to a first user device 110 and a first resource device 260, it may be implemented for any number and combination of user devices and resource devices simultaneously, serially, or otherwise.

FIG. 3 illustrates an example operational flow for system 100 used in combination with a network entity to track user devices within a space 102. Operation 600 begins at block 602 where first user preference information 122 associated with first user device 110 and first user profile information 120 associated with first user device 110 are stored in memory 116. Operation 600 continues at block 604 where wireless signals are communicated by user device 110 to wireless device 200 and first user preference information 122 is communicated to queue management server 300.

At block 606, wireless device 200 stores the wireless signals, determines location information for the first user device 110, and communicates the location information 212 for the first user device 110 to the queue management server 300. At block 608, server 300 stores location information 212 of the resource devices 260 and 280 and receives the location information for the first user device 110. At block 608, server 300 tracks movement of the first user device 110 within the space 102 over a period of time based at least in part upon the location information 212 for the first user device 110.

At block 610, server 300 determines that the first user device 110 is within a threshold distance 104 of a particular corresponding resource device based at least in part upon the determined location information 212 for the first user device 110 and the location information 212 for the corresponding resource device positioned in the space 102. For example, if first user device 110 has been matched with first resource device 260 in a data queue 124, then server 300 determines when first user device 110 is within a threshold distance 104 of first resource device 260. At block 612, server 300 communicates a notification signal to the first resource device 260 indicating that the first user device 110 is within the threshold distance 104 of the first resource device 260.

At block 614, server 300 communicates first user preference information 122 and first user profile information 120 to the first resource device 260. At block 616, first resources device 260 displays customized information for the first user device 110 based at least in part upon first user preference information 122 and first user profile information 120. At block 614, server 300 determines if there are additional user devices to process. If so, operation 600 returns to block 602. If not, operation 600 ends.

Although operation 600 is described with respect to tracking the location of a first user device 110 to within a threshold distance 104 of first resource device 260, it may be implemented for any number and combination of user devices and resource devices simultaneously, serially, or otherwise.

While several embodiments have been provided in the present disclosure, the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system for matching user devices with resource devices, comprising:
   a first user device associated with a first user, the first user device comprising a first user device memory and a first user device processor, wherein:
      the first user device memory stores first user preference information and first user profile information;
      the first user device processor is communicatively coupled to the first user device memory and configured to communicate the first user preference information to a queue management server;
   the queue management server comprising a queue management memory and a queue management processor, wherein:
      the queue management memory stores resources information that represents capabilities of a plurality of resources, and that indicates availability of each of the plurality of resources; and
      the queue management processor communicatively coupled to the queue management memory and configured to:
         parse the first user preference information;
         forecast an availability of the resources for the first user device based at least in part upon the resources information;
         select a first resource device to service the first user device based at least in part upon the forecast;
         add the first user device to an end of a first queue for the selected first resource device, wherein the first queue for the selected first resource device represents a numerically ordered list of user devices assigned to the selected first resource device; and
         communicate the first queue to the first user device.

2. The system of claim 1, further comprising:
   a second user device associated with a second user, the second user device comprising a second user device memory and a second user device processor, wherein:
      the second user device memory stores second user preference information and second user profile information;
      the second user device processor is communicatively coupled to the second user device memory and configured to communicate the second user preference information to the queue management server;
      the queue management processor is further configured to:
         parse the second user preference information;
         forecast an availability of the resources for the second user based at least in part upon the resources information;
         select a second resource device to service the second user device based at least in part upon the forecast;
         add the second user device to an end of a second queue for the selected second resource device, wherein the second queue for the selected second resource device represents a numerically ordered list of user devices assigned to the selected second resource device; and
         communicate the second queue to the second user device.

3. The system of claim 2, wherein:
   the resource information of the first resource includes a first service-type capability and a first resource availability range;
   the resource information of the second resource includes a second service-type capability and a second resource availability range;
   the parsed first user preference includes a first user availability and a first service-type;
   the parsed second user preference includes a second user availability and a second service-type;
   the queue management processor is further configured to:
      compare the first user availability and the first service type of the first user device with the first service type capability of the first resource device and the first resource availability range;
      assign the first user device to the first resource device based on the first comparison;
      compare the second user availability and the second service type of the second user with the second service type capability of the second resource and the second resource availability range; and assign the second user device to the second resource device based on the second comparison.

4. The system of claim 1, further comprising:
a second user device associated with a second user, the second user device comprising a second user device memory and a second user device processor, wherein:
the second user device memory stores second user preference information associated with the second user and second user profile information associated with the second user;
the second user device processor is communicatively coupled to the second user device memory and configured to communicate the second user preference information to the queue management server;
a third user device associated with a third user, the third user device comprising a third user device memory and a third user device processor, wherein:
the third user device memory stores third user preference information associated with the third user and third user profile information associated with the third user;
the third user device processor is communicatively coupled to the third user device memory and configured to communicate the third user preference information to the queue management server;
the queue management processor is further configured to:
parse the second user preference information and the third user preference information;
forecast the availability of the resources based at least in part upon the resources information;
select the first resource device to service the third user device and a second resource device to service the second user device based at least in part upon the forecast;
add the third user device to the first queue behind the first user device;
add the second user device to an end of a second queue for the selected second resource device, wherein the second queue represents a numerically ordered list of user devices assigned to the selected second resource device;
communicate the first queue to the third user device; and
communicate the second queue to the second user device.

5. The system of claim 4, wherein:
the resource information of the first resource includes a first service-type capability, a third service type capability, and a first resource availability range;
the resource information of the second resource includes a second service-type capability and a second resource availability range;
the parsed first user preference information includes a first user availability and a first service-type;
the parsed second user preference includes a second user availability and a second service-type;
the parsed third user preference includes a third user availability and a third service-type;
the queue management processor is further configured to:
compare the first user availability and the first service type of the first user with the first service type capability of the first resource and the first resource availability range;
assign the first user device to the first resource device based on the first comparison;
compare the second user availability and the second service type of the second user with the second service type capability of the second resource and the second resource availability range; and
assign the second user device to the second resource device based on the second comparison;
compare the third user availability and the third service type of the third user with the third service type capability of the second resource and the third resource availability range; and
assign the third user device to the first resource device based on the third comparison.

6. The system of claim 1, further comprising:
a resource device comprising a resource device memory and a resource device processor, wherein:
the resource device memory stores the first queue; and
the resource device processor is communicatively coupled to the resource device memory and configured to display a customized service based on at least one of the first user preference information and the first user profile information.

7. The system of claim 6, wherein the resource device is associated with the first resource and is a service kiosk device, and the customized service is based on a device type and at least one of the first user preference information and the first user profile information.

8. A method for matching user devices with resource devices, comprising:
storing first user preference information associated with a first user and first user profile information associated with the first user;
communicating the first user preference information to a queue management server;
storing resources information that represents capabilities of a plurality of resources, and that indicates availability of each of the plurality of resources;
parsing the first user preference information;
forecasting an availability of the resources for the first user based at least in part upon the resources information;
selecting a first resource device to service the first user device based at least in part upon the forecast;
adding the first user to an end of a first queue for the selected first resource device, wherein the first queue for the selected first resource device represents a numerically ordered list of user devices assigned to the selected first resource device; and
communicating the first queue to the first user device.

9. The method of claim 8, further comprising:
storing second user preference information associated with a second user and second user profile information associated with the second user;
communicating the second user preference information to the queue management server;
parsing the second user preference information;
forecasting an availability of the resources for the second user based at least in part upon the resources information;
selecting a second resource to service the second user based at least in part upon the forecast;
adding the second user device to an end of a second queue for the selected second resource device, wherein the second queue for the selected second resource device represents a numerically ordered list of user devices assigned to the selected second resource device; and
communicating the second queue to the second user device.

10. The method of claim 9, wherein:
the resource information of the first resource includes a first service-type capability and a first resource availability range;
the resource information of the second resource includes a second service-type capability and a second resource availability range;
the parsed first user preference includes a first user availability and a first service-type;
the parsed second user preference includes a second user availability and a second service-type;
the method further comprising:
   comparing the first user availability and the first service type of the first user with the first service type capability of the first resource and the first resource availability range;
   assigning the first user to the first resource based on the first comparison;
   comparing the second user availability and the second service type of the second user with the second service type capability of the second resource and the second resource availability range; and
   assigning the second user to the second resource based on the second comparison.

11. The method of claim 8, further comprising:
storing second user preference information associated with the second user and second user profile information associated with the second user;
storing third user preference information associated with the third user and third user profile information associated with the third user;
communicating the third user preference information to the queue management server;
parsing the second user preference information and the third user preference information;
forecasting the availability of the resources based at least in part upon the resources information;
selecting the first resource device to service the third user device and a second resource device to service the second user device based at least in part upon the forecast;
adding the third user device to the first queue behind the first user device;
adding the second user device to an end of a second queue for the selected second resource device, wherein the second queue represents a numerically ordered list of user devices assigned to the selected second resource device;
communicating the first queue to the third user device; and
communicating the second queue to the second user device.

12. The method of claim 11, wherein:
the resource information of the first resource includes a first service-type capability, a third service type capability, and a first resource availability range;
the resource information of the second resource includes a second service-type capability and a second resource availability range;
the parsed first user preference information includes a first user availability and a first service-type;
the parsed second user preference includes a second user availability and a second service-type;
the parsed third user preference includes a third user availability and a third service-type;
the method further comprising:
   comparing the first user availability and the first service type of the first user with the first service type capability of the first resource and the first resource availability range;
   assigning the first user to the first resource based on the first comparison;
   comparing the second user availability and the second service type of the second user with the second service type capability of the second resource and the second resource availability range; and
   assign the second user device to the second resource device based on the second comparison;
   compare the third user availability and the third service type of the third user with the third service type capability of the second resource and the third resource availability range; and
   assigning the third user device to the first resource device based on the third comparison.

13. The method of claim 8, further comprising:
storing the first queue; and
displaying a customized service based on at least one of the first user preference information and the first user profile information.

14. The method of claim 13, wherein the customized service is based on a device type and at least one of the first user preference information and the first user profile information.

15. A non-transitory computer-readable medium storing instructions that when executed by a processor cause the processor to perform the operations of:
storing first user preference information associated with a first user and first user profile information associated with the first user;
communicating the first user preference information to a queue management server;
storing resources information that represents capabilities of a plurality of resources, and that indicates availability of each of the plurality of resources;
parsing the first user preference information;
forecasting an availability of the resources for the first user based at least in part upon the resources information;
selecting a first resource to service the first user based at least in part upon the forecast;
adding the first user device to an end of a first queue for the selected first resource device, wherein the first queue for the selected first resource device represents a numerically ordered list of user devices assigned to the selected first resource device; and
communicating the first queue to the first user device.

16. The non-transitory computer-readable medium of claim 15, wherein the instructions further cause the processor to perform operations of:
storing second user preference information associated with a second user and second user profile information associated with the second user;
communicating the second user preference information to the queue management server;
parsing the second user preference information;
forecasting an availability of the resources for the second user based at least in part upon the resources information;
selecting a second resource to service the second user based at least in part upon the forecast;
adding the second user device to an end of a second queue for the selected second resource device, wherein the second queue for the selected second resource device represents a numerically ordered list of user devices assigned to the selected second resource device; and communicating the second queue to the second user device.

17. The non-transitory computer-readable medium of claim 16, wherein:

the resource information of the first resource includes a first service-type capability and a first resource availability range;

the resource information of the second resource includes a second service-type capability and a second resource availability range;

the parsed first user preference includes a first user availability and a first service-type;

the parsed second user preference includes a second user availability and a second service-type; and the instructions further cause the processor to perform operations of:

comparing the first user availability and the first service type of the first user with the first service type capability of the first resource and the first resource availability range;

assigning the first user device to the first resource device based on the first comparison;

comparing the second user availability and the second service type of the second user with the second service type capability of the second resource and the second resource availability range; and assigning the second user device to the second resource device based on the second comparison.

18. The non-transitory computer-readable medium of claim 15, wherein the instructions further cause the processor to perform operations of:

storing second user preference information associated with the second user and second user profile information associated with the second user;

storing third user preference information associated with the third user and third user profile information associated with the third user;

communicating the third user preference information to the queue management server;

parsing the second user preference information and the third user preference information;

forecasting the availability of the resources based at least in part upon the resources information;

selecting the first resource to service the third user and a second resource to service the second user based at least in part upon the forecast;

adding the third user device to the first queue behind the first user device;

adding the second user device to an end of a second queue for the selected second resource device, wherein the second queue represents a numerically ordered list of user devices assigned to the selected second resource device;

communicating the first queue to the third user device; and communicating the second queue to the second user device.

19. The non-transitory computer-readable medium of claim 18, wherein:

the resource information of the first resource includes a first service-type capability, a third service type capability, and a first resource availability range;

the resource information of the second resource includes a second service-type capability and a second resource availability range;

the parsed first user preference information includes a first user availability and a first service-type;

the parsed second user preference includes a second user availability and a second service-type;

the parsed third user preference includes a third user availability and a third service-type; and the instructions further cause the processor to perform operations of:

comparing the first user availability and the first service type of the first user with the first service type capability of the first resource and the first resource availability range;

assigning the first user to the first resource based on the first comparison;

comparing the second user availability and the second service type of the second user with the second service type capability of the second resource and the second resource availability range; and assign the second user device to the second resource device based on the second comparison;

compare the third user availability and the third service type of the third user with the third service type capability of the second resource and the third resource availability range; and assigning the third user device to the first resource device based on the third comparison.

20. The non-transitory computer-readable medium of claim 15, wherein the instructions further cause the processor to perform operations of:

storing the first queue; and displaying a customized service based on at least one of the first user preference information and the first user profile information.

* * * * *